United States Patent
Siol et al.

[11] Patent Number: 5,451,650
[45] Date of Patent: Sep. 19, 1995

[54] METHOD OF MANUFACTURING MONODISPERSE POLY(METH)ACRYLATE PARTICLES

[75] Inventors: Werner Siol, Darmstadt; Wilhelm Wopker, Bickenbach; Erwin Felger, Darmstadt; Markus Parusel, Messel, all of Germany

[73] Assignee: Roehm GmbH Chemische Fabrik, Darmstadt, Germany

[21] Appl. No.: 288,032

[22] Filed: Aug. 10, 1994

[30] Foreign Application Priority Data

Aug. 16, 1993 [DE] Germany ............ 43 27 464.1

[51] Int. Cl.$^6$ ............................................. C08F 120/14
[52] U.S. Cl. ............................. 526/201; 526/329.7; 428/402
[58] Field of Search ............................. 526/201, 329.7; 428/402

[56] References Cited

U.S. PATENT DOCUMENTS

| | | |
|---|---|---|
| 2,135,443 | 11/1938 | Strain . |
| 4,644,041 | 2/1987 | Winnik et al. . |
| 4,889,894 | 12/1989 | Siol et al. . |
| 4,892,909 | 1/1990 | Siol et al. . |
| 4,897,441 | 1/1990 | Siol et al. . |
| 4,904,749 | 2/1990 | Brusky et al. . |
| 4,952,455 | 8/1990 | Siol et al. . |
| 4,985,504 | 1/1991 | Siol . |
| 5,053,276 | 10/1991 | Siol . |
| 5,322,900 | 6/1994 | Siol et al. . |

FOREIGN PATENT DOCUMENTS

| | | | |
|---|---|---|---|
| 0342283 | 11/1989 | European Pat. Off. . | |
| 5-97905 | 4/1993 | Japan | 526/201 |
| 5-97906 | 4/1993 | Japan | 526/201 |

OTHER PUBLICATIONS

Chemical Abstracts, vol. 115:116478j, JP-A-03 058 840, Mar. 14, 1991.
Chemical Abstracts, vol. 101:173142e; vol. 101:172619d; vol. 101:172468d; vol. 101:24742y; vol. 101:24741x; vol. 99:141223f; vol. 96:218774j.
Chemical Abstracts, vol. 115, AN 115:209446n, JP-A-03 126 766, May 29, 1991.

*Primary Examiner*—Joseph L. Schoffer
*Assistant Examiner*—N. Sarofim
*Attorney, Agent, or Firm*—Oblon, Spivak, McClelland, Maier & Neustadt

[57] ABSTRACT

The invention relates to a method of manufacturing monodisperse poly(meth)acrylates by the method of precipitation polymerization, comprising polymerizing i) a monomer mixture comprising at least 60 wt. % of monomer of formula I

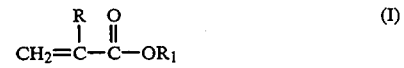

where
R represents hydrogen or methyl; and
$R_1$ represents a $C_{1-8}$ alkyl group, a $C_{6-24}$ aryl group, a $C_{1-8}$ alkyl substituted aryl group or an aralkyl group;

ii) 0.1–10 wt. % based on the weight of the monomer mixture of a block copolymer having polystyrene components; and iii) 0.02–2 wt. % based on the weight of the monomer mixture of a percarbonic acid ester;

in a halogen free solvent comprising 70 to 100 wt. % of cyclohexane.

6 Claims, 1 Drawing Sheet

METHOD OF MANUFACTURING MONODISPERSE POLY(METH)ACRYLATE PARTICLES

BACKGROUND OF THE INVENTION

Field of the Invention

The invention relates to a method of manufacturing monodisperse poly(meth)acrylate particles of stable shape, having diameter 1-20 micron.

Discussion of Related Art

The evidence in the industry indicates a growing demand for plastics in the form of elastic particles of stable shape having a defined, uniform particle size in the range 2-20 micron. Such particles are used, e.g., as spacers (e.g. in displays and films), surface modifying agents, support materials in diagnostics, etc.

However, the primary interest is in the area of the optics industry, in which particles in this size range having an index of refraction which can be precisely adjusted with respect to the index of refraction of a given polymer matrix can be used to achieve various optical effects.

In this connection, the profile of required properties for such particles with diameter 5-15 micron has long been known; however, there has not been available a practicable method of manufacturing such particles. The classical method of manufacturing defined particles, emulsion polymerization, does not succeed in this particle range (see 1992, "Ullmanns Encyclopedia of Industrial Chemistry"., 5th Ed., Vol. A21, pub VCH, pp 168, 373–387; Becker and Braun, 1990, "Kunststoff-Handbuch", Vol. 1, pub. Carl Hanser, pp. 26–28). In general, emulsion polymerization can be used to produce particles with diameter ≦2 micron, but attempts to produce larger particles are accompanied by problems, in particular formation of new particles, leading to multimodal particle size distributions. According to literature data it should be possible to manufacture particles of the stated size by repetitive absorption of aqueous dispersions containing monomers (see Ugelstad, J., Mork, P. C., Kaggurud. K. H., Ellingsen, T. and Berge, A., 1980 *Adv. Colloid Interface Sci.* 13, 191).

However, the method described is very complex. Another method, wherein the subject particles are manufactured in an environment with microgravity (in a space shuttle in space), holds little promise for industrial exploitation (see Vanderhoff, J. W., El-Asser., M. S., Micale, F. J.1, Sudol., E. D., Tsena, C. M., Silwanowicz, A., Sheu, H. R., and Kornfeld. D. M., 1986 P—*Mater. Sci. Eng. Prepr.* 54, 587). Thus it is concluded that heretofore no simple, industrially applicable method existed for manufacturing such particles in water as the reaction medium. Also, classical suspension polymerization technique, wherein it is well known that particle size is controlled primarily by the stirring speed, generally does not yield particles in the size range 5-15 micron. Moreover, these particles are not monodisperse, but have a wide particle size distribution.

The principal applications of these particles are light scattering applications wherein the index of refraction of the particles is an important factor (see Jap. Pat. App. 03-126,766; *Chem. Abstr.* 115, 209446n). Particles having a core-and-shell structure in this size range are frequently used for, e.g., matt coatings (Jap. Pat. App. 03-58,840; *Chem. Abstr.* 115, 116478; Eur. OS 342,283).

The possibility is more favorable of obtaining monodisperse PMMA particles with diameter 2-20 micron by producing the particles by the principle of precipitation polymerization in an organic medium, with the use of an organic dispersant.

There have been a relatively large number of publications on this subject. Precipitation polymerization of PMMA in hydrocarbons as solvents was proposed as early as the 1930s (U.S. Pat. No. 2,135,443, Ger. Pat. 662,157). Since then over 100 patent-type publications and numerous other publications have appeared which deal with polymerization of alkyl (meth)acrylates in non-aqueous dispersions.

In many of the patent-type publications mentioned, the applications described relate purely to paints and similar coatings, involving stable organic dispersions of very fine particles. There are also publications reporting investigation of the effect of emulsifiers, initiators, and solvent grade on the particle size. A very informative summary of dispersion polymerization of methyl methacrylate in non-aqueous media is provided in Winnik, M. A., et al., 1987, *Makromol. Chem. Macromol. Symp.* 10/11, 483–501.

Block copolymers are the most prominent emulsifiers used for dispersion polymerization. An overview of currently used polymerization conditions is provided in Winnik, M. A., et al., loc.cit., p. 485 (Table 1).

It may also be seen from Winnik, M. A., et al., loc.cit., that the particle size is controllable via the emulsifier concentration (FIG. 1), the initiator concentration (FIG. 5), and the solids content (FIG. 3) and solvent grade (FIG. 4). The graphics presented therein indicate that it is particularly possible to control in favor of larger particles (>3 micron) with the use of mixtures of tetrachloromethane and alkanes. If halogenated hydrocarbons are not employed, regimes are encountered in which it is not possible to control particle size; instead, coagulation occurs.

The use of halogenated hydrocarbons in industry can no longer be justified, because of deleterious ecological and toxicological effects. Accordingly, there is a need as described above, for means of producing monodisperse poly(meth)acrylate particles, preferably in the range of particle sizes of 1-20 micron, without the use of objectionable substances such as halogenated hydrocarbons. This problem is solved by the inventive method, which prescribes a specific formulation.

SUMMARY OF THE INVENTION

Accordingly, one object of the invention is to provide a method of manufacturing monodisperse poly(-meth)acrylates by the method of precipitation polymerization, comprising polymerizing i) a monomer mixture comprising at least 60 wt. % of monomer of formula I

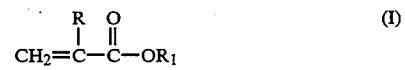

where
R represents hydrogen or methyl; and
$R_1$ represents a $C_{1-8}$ alkyl group, a $C_{6-24}$ aryl group, a $C_{1-8}$ alkyl substituted aryl group, particularly phenyl, or an aralkyl group, particularly benzyl;

ii) 0.1–10 wt. % based on the weight of the monomer mixture of a block copolymer having polystyrene components; and iii) 0.02-2 wt. % based on the weight of the monomer mixture of a percarbonic acid ester;
in a halogen free solvent comprising 70 to 100 wt. % of cyclohexane.

The inventively produced poly(meth)acrylate particles have particle sizes which, as a rule lie completely within the range 1-20 micron, preferably 2-20 microns (with the convention that the diameter in the plane of greatest extent is the measure of the particle size). (Particle sizes are determined with a light microscope.)

In contrast to classically manufactured polymer beads, the products of the inventive method have a very narrow size distribution; accordingly, in the context of the present invention they are described as "monodisperse". This is understood to signify that at least 80 wt. % of the particles, preferably 90 wt. % lie within a size range of ±20% from the stated mean value. On occasion, relatively small proportions (<5 wt. %) of finer particles may be produced; these are not deleterious to the applications envisioned.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
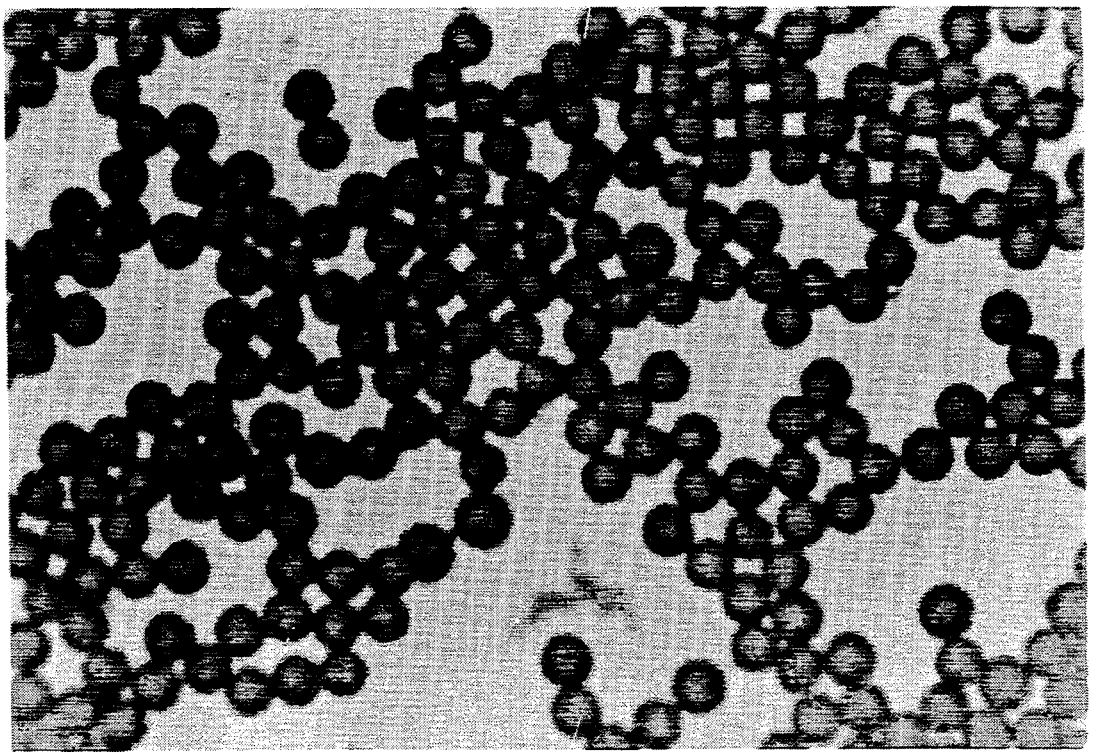
FIG. 1 shows the particles at a magnification of ~1:1000.

The solvents employed according to the invention are halogen-free. Accordingly the solvent is not substituted with halogen groups.

The block copolymers with polystyrene components are preferably selected from the group comprised of a polystyrene with an ethylene-co-propylene block (hydrogenated polyisoprene); and a polystyrene with an ethylene-co-butylene block (hydrogenated polybutadiene).

The amount of the polystyrene block with respect to the amount of the other block copolymer component in the block copolymer is preferably in the range of 20-50 wt. %.

In general, the block copolymer has a molecular weight in the range $M_W=30,000-200,000$, preferably 70,000-130,000.

The primary candidate for the monomer of formula I is methyl methacrylate, preferably comprising at least 20 wt. % of the monomer mixture and possibly as much as 100 wt. %. The other monomers (if any) may be, particularly, methyl acrylate, ethyl (meth)acrylate, butyl acrylate, isobutyl methacrylate, and/or 2-ethylhexyl (meth)acrylate, in amounts up to 20 wt. % each.

In general among the monomers of formula I those in which R represents $CH_3$ (i.e. methacrylates) are preferred.

To increase the index of refraction, preferably $C_{6-14}$ aryl- and/or $C_{6-14}$ aralkyl (meth)acrylates are used, particularly phenyl-, tolyl-, naphthyl-, benzyl-, and,/or phenylethyl (meth)acrylate(s), in amounts of 1-80 wt. %., preferably from 10-60 wt. %, more preferably from 30-40 wt. %. based on the total weight of the monomer mixture. Advantageously the amount of vinylaromatics, such as styrene and its homologs, is limited to <20 wt. % (based on the weight of monomer mixture), because these monomers substantially disturb the course of the polymerization.

The particle size can be regulated in favor of reduced size by the use of hydrophilic monomers. Candidates for use as hydrophilic monomers are, e.g., hydroxy- and/or (possibly) alkyl-substituted $C_{1-12}$ aminoalkyl esters of (meth)acrylic acid, and the corresponding amides.

Hydrophobic comonomers such as, e.g., the above-mentioned isobutyl methacrylate, phenyl methacrylate, and/or benzyl methacrylate, which may be employed in the amount of 0 - c. 70 wt. % (based on the weight of the monomer mixture), regulate the particle size in favor of increased size.

Crosslinking of the monomers may be provided for by employing grafting crosslinkers, i.e. monomers having two radically polymerizable groups of different reactivity, e.g. allyl (meth)acrylate, in amounts of 0.1-20 wt. % (based on the total weight of the monomer mixture). On the other hand, as to crosslinking monomers having identical or similar polymerizable groups, e.g. (meth)acrylate esters of polyhydric alcohols, one should limit their use to <1 wt. % (based on the total weight of the monomer mixture).

The solvent, or solvent mixture, may contain ≦30 wt. % of other solvents, but not halogenated solvents, e.g. polar solvents such as butyl acetate.

The percarbonic acid esters proposed as initiators according to the invention are known. Candidates for use as this component are, e.g., in particular, bis(4-tert-butylcyclohexyl)peroxydicarbonate and dicyclohexyl-peroxydicarbonate (obtainable from the firm Peroxid-chemie, under the trade name Interox BCHPC® or Interox CHPC®). (See Brandrup and Immergut, 1989, "Polymer Handbook". 3rd Ed., pub. J. Wiley, p. II-1.)

The amount of percarbonic acid ester initiator used is from 0.02-2 wt. %, preferably from 0.1-1 wt. %, more preferably from 0.2-0.5 wt. % based on the total weight of the monomer mixture.

The styrene block copolymers preferably are comprised of polystyrene blocks in the amount of 30-50 wt. %, in addition to propylene- and/or butylene blocks derived from hydrogenation of polyisoprene and/or polybutadiene; for example a styrene-isoprene block copolymer of the type of SHELLVIS 50® (available from Shell).

The amount of styrene block copolymer used is from 0.1 to 10 wt. %, preferably from 0.2-5 wt. %, more preferably from 0.5-1 wt. % based on the total weight of the monomer mixture.

The polymerization may be carried out in a reactor suitable for precipitation polymerization with small reaction volumes, e.g. a 500 ml three-neck flask equipped with a condenser, a device for supplying an inert gas, a thermometer, and a stirrer. Advantageously the method is carried out under an inert gas such as argon or nitrogen. Advantageously, one initially charges the following to the reactor to form a solution: the solvent, the monomer mixture (particularly the monomer of formula I), and the emulsifier. A suggested amount of the solvent is, e.g., 150 parts by weight (pbw) (based on the weight of the monomer mixture). Preferably, pure cyclohexane is used. Then the reaction mixture is heated, e.g. to 60° C. When the selected interior temperature is reached, the polymerization is initiated under stirring by adding the initiator, preferably dissolved in a small amount of cyclohexane.

Ordinarily the temperature rises automatically after a short time, e.g. 1 min, wherein the previously clear solution becomes cloudy. After c. 5 min, in general the reaction mixture has already turned white. Under the conditions reported, after 20 min the internal temperature is likely to have reached 81° C., at which point said temperature may remain at this level for several minutes, as a result of cooling caused by boiling.

In a typical precipitation polymerization, the process advances quite rapidly, so that attention must be paid to adequate cooling and stirring. For after-reaction, one maintains the mixture at c. 80° C. for a certain time further, e.g. c. 1 hr, under stirring, and then cools it to room temperature, also under stirring.

The dispersions obtained in this manner are almost completely free of coagulates. Monodisperse polymer particles in the prescribed particle size range (diameter 1–20 micron) are obtained.

The method may be used to produce pure polymethacrylate particles or uncrosslinked copolymer particles, or, preferably, crosslinked particles, where allyl methacrylate is preferred as a crosslinking agent.

Of interest are crosslinked, homogeneous particles comprised of MMA in the amount of 90–99.5 wt. % and allyl methacrylate in the amount of 10–0.5 wt. %, in the particle size range 4.0–10.0 μm.

Also preferred are crosslinked particles comprised of allyl methacrylate (0.5–10 wt. %), phenyl methacrylate (10–50 wt. %), and methyl methacrylate (40–89.5 wt. %), as well as additional methacrylate esters (0–20 wt. %).

Of particular interest are crosslinked particles of the following composition:
30–80 wt. % methyl methacrylate
60–19.5 wt. % benzyl methacrylate
10–0.5 wt. % allyl methacrylate,
with particle size 4–12 micron, preferably 5–11 micron, particularly preferably 7.5±2 micron.

The particularly preferred content of allyl methacrylate is in the range 3–7 wt. %, more particularly 4–6 wt. %. The benzyl methacrylate may be partially or completely replaced by phenylpropyl methacrylate or phenylethyl methacrylate. Also, the methyl methacrylate may be replaced in amounts of up to c. 10 wt. % by other (meth)acrylic acid esters, e.g. isobutyl methacrylate.

Particles with a smooth surface are of interest. However, from the standpoint of application technology, particles having a rough surface are particularly valuable.

Particularly preferred are round, crosslinked particles with a rough surface, in a particle size range of 5.5–9.5 micron, having the following approximate composition:
55 wt. % methyl methacrylate
40 wt. % benzyl methacrylate
5 wt. % allyl methacrylate.
Particularly preferred are particles of this type in which the above-prescribed copolymer composition comprising methyl methacrylate, benzyl methacrylate, and allyl methacrylate is relatively homogeneous throughout the particle—thus, particles which do not have a core-and-shell structure. Such particles, having a rough surface, and a particle size range of 4–12 micron, particularly 7.5±2 micron, with the above-mentioned polymer composition comprising methyl methacrylate, benzyl methacrylate, and allyl methacrylate, are highly suitable for incorporating in molding compounds.

In general, the described method is especially well suited for manufacturing particles with an index of refraction of 1.48–1.58 and a particle size in the range 4–12 micron.

Preferred are particles with an index of refraction $n_D^{20}$ in the range 1.500–1.550, preferably 1.510–1.530, and a particle size of 7.5±2 micron.

Particularly preferred are, as described above, particles of a composition comprising methyl methacrylate, benzyl methacrylate, and allyl methacrylate, having a rough surface, with the structure of the surface roughness of the particle being such that it is clearly recognizable under a light microscope at a magnification of c. 500 X.

Such particles, particularly such particles with a rough surface and having a particle diameter of 4–12 micron, preferably 7.5±2 micron, are especially well suited for incorporating in molding compounds, in amounts of 0.01–60 wt. %, preferably 0.5–25 wt. %.

All thermoplastically processible molding compounds are possibilities for incorporating such particles, particularly molding compounds which are amorphous, highly transparent, and possibly colored, which molding compounds are of the type of polymethacrylate, polymethacrylate-styrene copolymers, polymethacrylate-styrene-maleic anhydride copolymers, polymethacrylimides, polycarbonates (particularly bisphenol-A polycarbonate), polystyrene, and polyvinyl chloride. Of particular interest are molding compounds based on polymethyl methacrylate and polycarbonate.

The molding compounds can be used as such or with impact strength modifiers.

In addition to the use of the inventive particles in molding compounds, they may be used in casting resins. They may be particularly used, as well, by incorporating them in paints and the like, particularly in reactive paints which are UV-curable, in amounts of 0.01–30 wt. %.

When the monodisperse particles are used in molding compounds, they may be employed in concentrates (master batches) or in direct dry mixtures. Molding compounds or dry mixtures containing these particles may be processed by known thermoplastic methods, e.g. extruding, injection molding, injection blow-molding, extrusion blowing, and extrusion.

The monodisperse polymer beads can be used advantageously for pure surface upgrading of molded articles; or special optical effects can be achieved by incorporating these particles in molding compounds, coextrusion compounds, or paints and the like.

Molding compounds containing these monodisperse particles may be used, particularly, in manufacturing rear-projection screens, TV screens (e.g. diaprojection screens or image devices in general), projection screens, protective covers or masks for monitors, scale covers (on measuring instruments), lamp covers, and dispersion lenses.

Room divider walls may also be manufactured with molding compounds containing the inventive beads.

The applications mentioned represent only a small fraction of the potential applications for molding compounds containing these monodisperse particles, particularly such particles having rough surfaces.

The following Examples serve to illustrate the invention. In the Examples, the particle sizes were determined by a light microscope.

Having generally described this invention, a further understanding can be obtained by reference to certain specific examples which are provided herein for purposes of illustration only and are not intended to be limiting unless otherwise specified.

EXAMPLE 1

The following compounds were dissolved in a 500 mL three-neck flask equipped with a condenser, an argon feed, a thermometer, and a stirrer, and were heated to 60°0 C.:

150 g cyclohexane 100 g methyl methacrylate 0.625 g hydrogenated styrene-isoprene block copolymer, comprised of 40 pbw styrene and 60 pbw isoprene. Nonuniformity U=0.04. (The product SHELLVIS 50®, supplied by Shell Intl. Chemical Co., London.)

When the internal temperature had reached 60° C., the polymerization was initiated by addition of 1 g bis(4-tert-butylcyclohexyl)-peroxydicarbonate (dissolved in a small amount of cyclohexane). Within 1 min the temperature rose to 61° C. The previously clear solution became appreciably cloudy. Within 5 min the reaction mixture was white. After 20 min, the internal temperature had risen to 81° C. At that temperature the internal temperature remained constant for several minutes (due to cooling by boiling). For post-reaction, the mixture was stirred an additional 1 hr at 80° C., and then was cooled under stirring.

The dispersion formed was nearly completely free of coagulate. The particles obtained were monodisperse, with a mean particle diameter 4.5 micron.

The solid was recovered from the dispersion by filtration, or by sedimentation, decanting, and subsequent drying.

EXAMPLE 2

Production of crosslinked polymethacrylate particles with an elevated index of refraction:

The following compounds were charged to a 250 mL reactor equipped with a condenser, an $N_2$ feed, a temperature sensor, a thermostat, and a stirrer:

129.55 g cyclohexane 41.16 g methyl methacrylate 27.90 g benzyl methacrylate 0.70 g allyl methacrylate 0.43 g hydrogenated styrene-isoprene block copolymer (SHELLVIS 50®).

The initiator solution comprised 0.70 g bis(4-tert-butylcyclohexyl)-peroxydicarbonate in 6.3 g cyclohexane.

The reactor was purged with nitrogen. The reaction was carried out under nitrogen. The hydrogenated styrene-isoprene block copolymer, the monomers, and the cyclohexane were charged to the reactor. The bath was heated to c. 65° C. After the internal temperature reached 65° C., the reaction was initiated by addition of the initiator solution. After 75 min, 0.1 wt. % tert-butyl per-2-ethylhexanoate (based on the weight of the monomer mixture) was added, for post-crosslinking. The dispersion was stirred another 2.5 hr at elevated temperature, and was then cooled and allowed to stand.

The dispersion was free of coagulates. The particles obtained were monodisperse, with mean particle diameter 7-6.5 micron. FIG. 1 shows the particles at a magnification of c. 1:1000×.

EXAMPLES 3-12

The procedure was analogous to that of Example 2. The data are reported in Tables 1 and 2.

Table 1: Dispersion of 99:1 pbw methyl methacrylate-allyl methacrylate copolymer, with solids content 30 wt. %, using bis(4-tert-butylcyclohexyl)-peroxydicarbonate as the initiator. (All percentage figures in wt. %., based on the weight of the monomer mixture.)

| Example No. | Initiator (wt. %) | Hydrogenated styrene-isoprene block copolymer (wt. %) | Cyclohexane (wt. %) | Butyl acetate (wt. %) | Particle Size (micron) |
|---|---|---|---|---|---|
| 3 | 0.25 | 0.63 | 100 | 0 | 3.0 |
| 4 | 0.25 | 0.63 | 91.4 | 8.6 | 4.1 |
| 5 | 0.25 | 0.63 | 88.4 | 11.6 | 4.6 |
| 6 | 0.25 | 0.63 | 85.9 | 14.1 | 4.8 |
| 7 | 0.25 | 0.63 | 82.9 | 17.1 | 5.3 |
| 8 | 0.25 | 0.63 | 79.9 | 20.1 | 6.4 |

As may be seen, the size of the particles increases with increasing addition of butyl acetate to the cyclohexane. Comparing Example 11 with Example 4, it is seen that when a hydrophobic monomer is used (isobutyl methacrylate), with an otherwise similar formulation, the particles are larger. Other possible means of controlling particle size are the solids content and the initiator concentration. Increasing both together leads to larger particles, as may be seen from comparison of Examples 1 and 3. Small amounts of allyl methacrylate do not appear to have a substantial influence on the particle size.

Table 2: Dispersion of 90:10 pbw methyl methacrylate-isobutyl methacrylate copolymer, with solids content 30 wt. %, using bis(4-tert-butylcyclohexyl)-peroxydicarbonate as the initiator. (All percentage figures in wt. %., based on the weight of the monomer mixture.)

| Example No. | Initiator (wt. %) | Hydrogenated styrene-isoprene block copolymer (wt. %) | Cyclohexane (wt. %) | Butyl acetate (wt. %) | Particle Size (micron) |
|---|---|---|---|---|---|
| 9 | 0.25 | 0.63 | 96.4 | 3.6 | 4.8 |
| 10 | 0.25 | 0.63 | 92.9 | 7.1 | 6.2 |
| 11 | 0.25 | 0.63 | 91.4 | 8.6 | 6.7 |
| 12 | 0.25 | 0.63 | 89.3 | 10.7 | 6-10** |

**Multi-modal

EXAMPLE 13

Production of crosslinked particles with rough surfaces, comprised of methyl methacrylate, phenyl methacrylate, and allyl methacrylate:

In a 500 mL reactor with stirrer, condenser, nitrogen feed, and temperature sensor, the following mixture was heated to 70° C.:

199 g cyclohexane 68.6 g methyl methacrylate 29.4 g phenyl methacrylate 1 g allyl methacrylate 0.62 g SHELLVIS 50®.

The reactor contents were stirred at 68 rpm. To initiate the reaction, 1 g bis(4-tert-butylcyclohexyl)peroxydicarbonate (as a 10% solution in cyclohexane) was added. After c. 2 min, slight clouding was perceptible, and after 10 min the reaction mixture had become white. The internal temperature was maintained at <74° C. After 75 min the reaction was terminated. For post-reaction, 0.1 g tert-butyl per-2-ethylhexanoate was added, and the mixture was stirred an additional 2½ hr at 75° C., followed by cooling. The dispersion was free of coagulates. The particle size was 8 micron. The particles had a rough surface.

EXAMPLE 14

Production of crosslinked particles with rough surfaces, which particles are comprised of methyl methacrylate, benzyl methacrylate, and allyl methacrylate:

The following mixture was charged to a reactor as described in Example 13, and the mixture was heated to 71° C.:

136.5 g cyclohexane
34.5 g methyl methacrylate
25.1 g benzyl methacrylate
3.1 g allyl methacrylate
0.8 g SHELLVIS ®50.

The polymerization was initiated by adding 0.63 g bis(4-tert-butylcyclohexyl)-peroxydicarbonate and 0.06 g tertbutyl per-2-ethylhexanoate, in 6.2 g cyclohexane. After 75 min the internal temperature was increased to 75° C. and stirring was continued for 2 hr at this temperature. A coagulate-free dispersion was obtained. The dispersion contained <2 wt. % of fines (<1 micron). More than 98 wt. % of the particles had a size of 9 micron. The particles of 9 micron size were rough and angular. The particles were filtered out and were dried in vacuum.

EXAMPLE 15

The method differed as follows from that of Example 14: Initiation was with 0.63 g bis(4-tert-butylcyclohexyl)peroxydicarbonate dissolved in 5.67 g cyclohexane. After-reaction was carried out by addition of 0.06 g t-butyl perneodecanoate in 0.54 g cyclohexane. Stirring was continued an additional 1 hr at 75° C., followed by cooling and filtration. Polymer beads with a particle size 8.3 micron were obtained, which were rough and angular. The particles were dried in vacuum.

EXAMPLE 16

Incorporation of the monodisperse particles into polymethyl methacrylate molding compounds:

6 pbw monodisperse polymer beads according to Example 15 were mixed with 94 pbw PMMA granulate (PLEXIGLAS ® 8N), and were then homogeneously distributed in the melt in a degassing extruder at 230° C. The resulting extruded strings were granulated.

EXAMPLE 17

Meter covers were injection molded from the granulate according to Example 16. The meter covers had high transparency and optimal dispersion.
Sample thickness: 2 mm.
Energy half-value angle (gamma/2): 15°.
Transmissivity, T: 90%.

EXAMPLE 18

Incorporation of the monodisperse particles into high impact PMMA molding compounds:

6 pbw monodisperse polymer beads according to Example 15 were mixed with 94 pbw PLEXIGLAS ® zK6A, and the mixture was granulated.

EXAMPLE 19

The granulate according to Example 18 was applied in a 100 micron layer thickness to 3 mm ABS (as a support), in a coextrusion process. The coextrusion composite was distinguished by a satin finish.
Roughness (measured with a Perth-O-Meter):
RA=0.38
RZ=2.60
Rmax=3.02.

Obviously, numerous modifications and variations of the present invention are possible in light of the above teachings. It is therefore to be understood that within the scope of the appended claims, the invention may be practiced otherwise than as specifically described herein.

This application claims the benefit of priority under 35 USC 119 to German Patent Application P 43 27 464.1. filed in the German Patent Office on Aug. 16, 1993, the entire contents of which are hereby incorporated by reference.

What is claimed as new and desired to be secured by Letters Patent of the United States is:

1. A method of manufacturing monodisperse poly(meth)acrylates by the method of precipitation polymerization, comprising polymerizing i) a monomer mixture comprising at least 60 wt. % of monomer of formula I

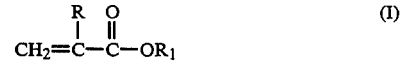

where
R represents hydrogen or methyl; and
$R_1$ represents a $C_{1-8}$ alkyl group, a $C_{6-24}$ aryl group, a $C_{1-8}$ alkyl substituted aryl group or an aralkyl group;
ii) 0.1–10 wt. % based on the weight of the monomer mixture of a block copolymer having polystyrene components; and
iii) 0.02–2 wt. % based on the weight of the monomer mixture of a percarbonic acid ester;
in a halogen free solvent comprising 70 to 100 wt. % of cyclohexane.

2. The method of claim 1 wherein said monodisperse poly(meth)acrylate particles have diameters in the range 2–20 micron.

3. The method of claim 1 wherein said monomer mixture comprise ≦20 wt. % methyl methacrylate.

4. The method of claims 1 or 2; wherein said block copolymer having polystyrene components is selected from the group consisting of ethylene-co-propylene-polystyrene and ethylene-co-butylene-polystyrene blocks.

5. The method according to any one of claims 1–3; further comprising a graft crosslinking agents in the amount of 0.1–20 wt. % (based on the weight of the monomer mixture).

6. The method according to any one of claims 1–3; wherein said monomer mixture further comprising 1–80 wt. % (based on the weight of the monomer mixture) $C_{6-14}$ aryl- or $C_{6-14}$ aralkyl methacrylates in the ester part.

* * * * *

UNITED STATES PATENT AND TRADEMARK OFFICE
CERTIFICATE OF CORRECTION

PATENT NO. : 5,451,650

DATED : September 19, 1995

INVENTOR(S) : Siol et al.

It is certified that error appears in the above-identified patent and that said Letters Patent is hereby corrected as shown below:

Column 10,
Claim 3, line 2, replace "$\leq$ 20 wt.%" with, --at least 20 wt.%.--.

Signed and Sealed this

Seventh Day of January, 1997

Attest:

BRUCE LEHMAN

Attesting Officer

Commissioner of Patents and Trademarks